United States Patent [19]

Atkinson

[11] 4,380,132
[45] Apr. 19, 1983

[54] FISHING LURE WITH VIBRATION PRODUCING MEANS

[76] Inventor: James K. Atkinson, 504 Harrison St., Dardanelle, Ark. 72834

[21] Appl. No.: 918,405

[22] Filed: Jun. 23, 1978

[51] Int. Cl.³ .............................................. A01K 85/01
[52] U.S. Cl. .................................... 43/26.2; 43/42.31; 43/42.35
[58] Field of Search ....................... 43/42, 26.2, 42.31, 43/17.1, 42.35

[56] References Cited

U.S. PATENT DOCUMENTS

| | | | |
|---|---|---|---|
| 1,906,791 | 5/1933 | Grossmann | 43/17.1 |
| 2,757,475 | 8/1956 | Pankoue | 43/42.31 X |
| 2,784,399 | 3/1957 | Smith | 43/42.31 X |
| 2,909,863 | 10/1959 | Rector | 43/42.31 |
| 3,310,902 | 3/1967 | Godby | 43/17.1 |
| 3,841,012 | 10/1974 | Maled | 43/26.2 |

Primary Examiner—Nicholas P. Godici
Assistant Examiner—Marc Hodak
Attorney, Agent, or Firm—Colton & Stone, Inc.

[57] ABSTRACT

A fishing lure having a water-tight cavity has a wire spring within the cavity, one end of the spring being rigidly affixed to the lure body and the opposite end carrying a weight. The relationship between the cavity size and the weighted spring is such that the spring will oscillate freely within the cavity without the weight striking the cavity walls during normal movement of the lure through the water. Alternate forms of the invention utilize an electronic oscillator driven transducer to produce vibration of the lure body.

4 Claims, 7 Drawing Figures

FISHING LURE WITH VIBRATION PRODUCING MEANS

BACKGROUND OF THE INVENTION

The purpose of any fishing lure is to attract a fish by mimicking a creature which is a part of the normal diet of the fish, such as a worm, amphibian, or smaller fish. Among the expedients taught by the prior art are arrangements for producing sounds and vibrations. For example, Miller U.S. Pat. No. 2,552,730, provides a leaf spring which vibrates when the fishing line is given a sudden jerk. Since the spring vibrates in the water, however, the vibrations are of only short duration and thus effective only if a fish is in the immediate vicinity of the lure at the instant the spring is put in motion. Rector et al., U.S. Pat. No. 2,909,863, discloses a lure which produces a knocking or tapping sound by means of a weight striking the walls of the hollow interior of the lure. The action of this lure depends upon movement of the lure through the water and, consequently, results in an erratic tapping rather than uniform vibrations. A piezoelectric transducer powered by a transistorized oscillator circuit is utilized in the lure shown in Pankove, U.S. Pat. No. 2,757,475.

The primary object of the present invention is the provision of a fishing lure having means for producing sustained vibrations to attract fish.

It is also an object of the invention to provide a lure which is of simple construction and which is reliable in operation.

A further object of the invention is the provision of a lure which produces sustained vibrations without requiring repeated operations such as tugging or jerking on the fishing line.

BRIEF SUMMARY OF THE INVENTION

The above and other objects of the invention which will become apparent hereinafter are achieved by the provision of a fishing lure having a water-tight cavity, a wire spring within the cavity and secured at one of its ends to the cavity wall and a weight attached to the free end of the spring with the cavity being of sufficient size as to allow the weighted spring to oscillate freely without contacting the cavity walls. The lure may also include a transducer driven by a stable oscillator circuit operating at the natural frequency of the weighted spring and located adjacent thereto to provide continuous vibration. Further modifications provide for oscillating the weight directly by means of the transducer.

For a more complete understanding of the invention and the objects and advantages thereof, reference should be had to the following detailed description and the accompanying drawings wherein preferred embodiments of the invention are described and shown.

DETAILED DESCRIPTION OF THE PREFERRED EMBODIMENTS

Figure 1:
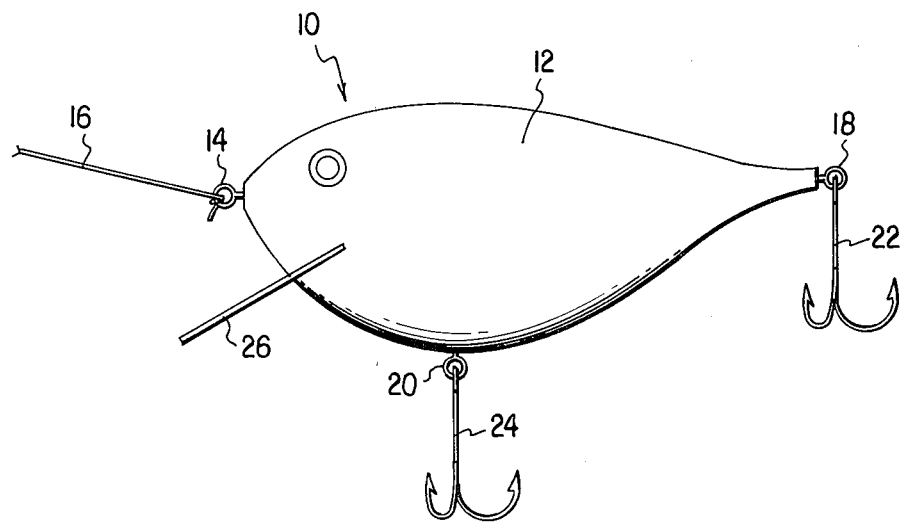
FIG. 1 is a side elevational view of a fishing lure constructed in accordance with the present invention.
Figure 2:
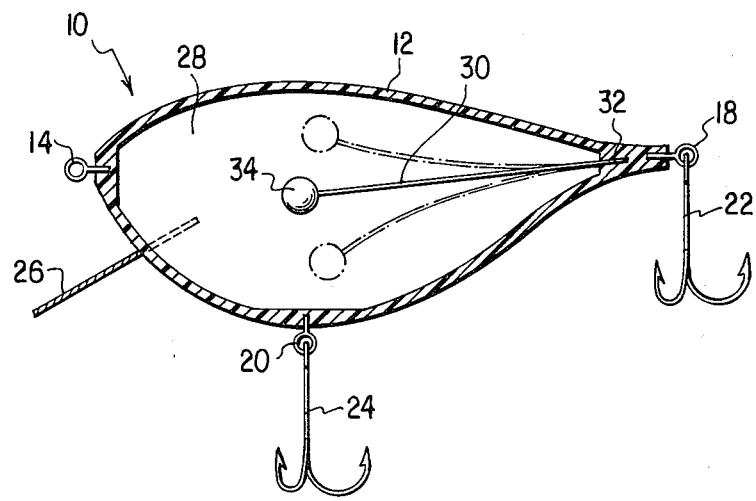
FIG. 2 is a vertical longitudinal cross-sectional view of the lure of FIG. 1.
Figure 3:
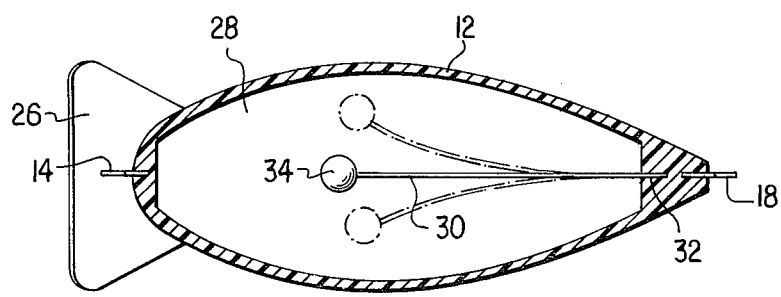
FIG. 3 is a horizontal longitudinal cross-sectional view of the lure of FIG. 1.

Referring now to FIGS. 1-3, there is shown a lure, designated generally by the reference numeral 10, which has a body portion 12 of bulbous configuration and provided with an eye 14 at its forward end for connection to a fishing line 16 and with eyes 18 and 20 at the rear and bottom of the lure, respectively, to which are attached fish hooks 22 and 24. As is conventional in lures of the configuration shown, a forwardly and downwardly projecting lip 26 is provided at the forward end of the lure.

The interior of the lure body 12 is hollow, forming an air filled, water-tight cavity 28. Within the cavity 28 there is provided a length of spring wire 30, one end of which is firmly secured to the body 12, preferably at the rear thereof, as indicated by the numeral 32. Affixed to the free end of the spring 30 is a weight 34, preferably a small body of lead. The weight and spring form a resonant system which, when set in motion, will oscillate at a frequency determined by the mass of the weight 34 and the length and stiffness of the spring 30. An important aspect of the invention is the fact that the cavity 28 of the lure body 12 is of sufficient size as to allow the weight and spring to oscillate at a large amplitude without contacting the side walls of the cavity, since the length of time during which the weight and spring will oscillate after being set in motion varies directly with the initial amplitude of the oscillations.

The weight and spring are set in motion in response to movements of the lure having a component transverse to the neutral position of the spring. Thus, in the lure of FIGS. 1-3 wherein the spring 30 projects forwardly from the rear of the lure, vertical and lateral movements will be effective to start the weight and spring oscillating. The abrupt movement of casting the lure into the water is effective. Likewise, the bobbing of the lure on the surface of the water due to small waves or bumping of the lure as it is pulled across the bottom of the lake or stream will serve to start or reinforce the oscillations.

The reaction to the oscillating motion of the spring and weight is coupled to the lure body 12 by virtue of the connection 32 between the spring 30 and lure body 12. The consequent vibration of the lure body, at the frequency of the oscillating weight and spring, is transmitted to the water and serves to attract fish to the lure. These vibrations are of very low frequency, below that which is audible to the human ear, closely duplicating the vibrations set up in the water by small fish. In addition to attracting fish, the low frequency vibrations serve, when a fish has taken the lure, to create a sensation of life in the lure, thus inducing the fish to retain the lure in its mouth. This allows the fisherman more time in which to set the hook before the fish attempts to expell the lure.

While, in the embodiment described above, a wire spring is employed, other types of springs may be used, for example, a leaf spring or a coil spring. Also, the configuration of the lure body may be varied as desired so long as the interior cavity is of sufficient size as to allow the weight and spring to oscillate freely therein.

Figure 4:
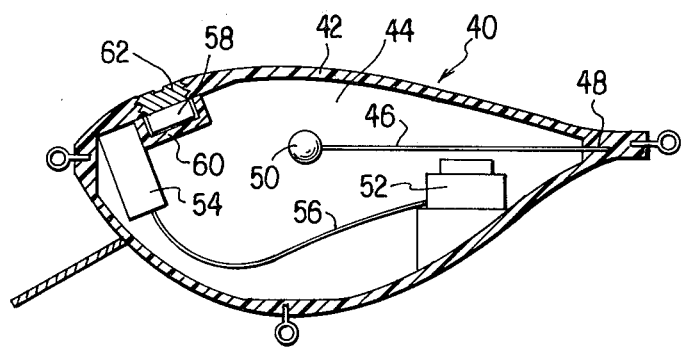
FIG. 4 is a vertical longitudinal cross-sectional view of a second embodiment of the invention.
Figure 5:
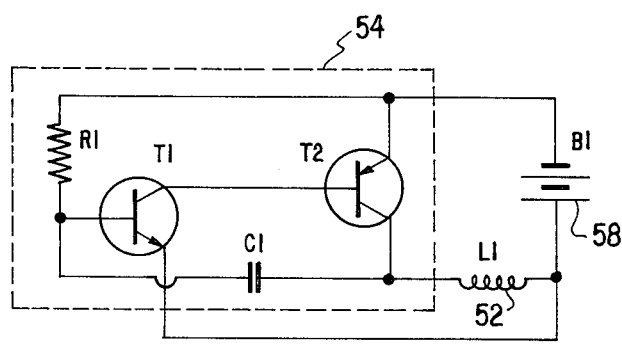
FIG. 5 is a schematic showing of the oscillator circuit employed in the lure of FIG. 4.

Referring now to FIGS. 4 and 5, there is shown a second embodiment of my invention. The lure of this embodiment, designated generally by the reference numeral 40, has a body shell 42 of generally bulbous configuration with a water-tight interior cavity 44. As in the previously described embodiment, a spring 46 is provided in the cavity, one end 48 of the spring being affixed to the body shell 42 and a weight 50 being provided at the opposite end. Mounted on the cavity wall and closely adjacent the spring 46 is an electromagnetic transducer 52. A transistorized oscillator circuit 54 powers the transducer through conductors 56, the circuit receiving power from a battery 58 housed in a chamber 60. Access to the chamber 60 for insertion and replacement of the battery is provided by a cover 62 which forms a water-tight closure and may take the form of a threaded plug as shown. The oscillator circuit is shown schematically in FIG. 5 and is a well-known stable oscillator circuit whose frequency is determined by the values of the capacitor C1 and resistor R1. These components are selected so that the oscillator supplies current pulses to the coil L1 of the transducer 52 at the natural resonant frequency of the weight and spring assembly. Consequently, the magnetic pulses of the transducer 52, acting on the spring 46, cause the weight and spring to vibrate without the necessity of an external force. As with the previously described embodiment, vibration of the weight and spring is coupled to the lure body and, thus, is transmitted through the surrounding water.

Figure 6:
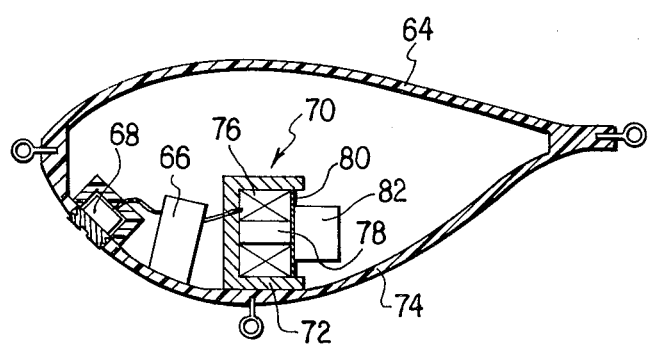
FIGS. 6 and 7 are fragmentary cross-sectional views showing further modifications of the lure of the present invention.
Figure 7:
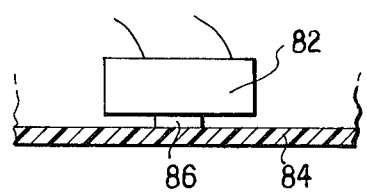

Further modifications of the invention particularly suitable for use in small sized lures are disclosed in FIGS. 6 and 7. The lure of FIG. 6 has a hollow body 64 in which is housed an oscillator circuit 66, which may be of the type shown in FIG. 5, a battery 68 supplying power to the oscillator circuit. The transducer 70, which is of the same type as the transducer 52 of the previously described embodiment, has a casing 72 which is securely attached to a wall 74 of the lure body. With the casing 72 is a transducer coil 76 wound on a magnitizable core 78. A flexible diaphram 80 forms a closure for the casing 72 and has a weight 82 affixed to its outer surface. The weight 82 is of a magnetically attractable material and, when the transducer 70 is energized by the oscillator circuit 66, vibrates with the diaphram at the frequency determined by the oscillator circuit. The resultant reactive force is transmitted through the transducer casing 72 to the wall 74 of the lure and from the wall to the surrounding water.

In the embodiment of FIG. 7, the transducer body itself serves as the vibrating mass. This is accomplished by attaching the transducer 82 to a wall 84 of the lure by means of a spacer 86 on the outer surface of the transducer diaphram.

While specific embodiments of the invention have been described in detail herein, it will be understood that the invention is not limited thereto. Reference should therefore be had to the appended claims in determining the true scope of the invention.

I claim:
1. A fishing lure comprising:
 a body member having walls defining a water-tight cavity;
 an elongated spring of a magnetically attractable material within said cavity and affixed at one of its ends to said wall;
 a weight affixed to the other end of said spring;
 an electromagnetic transducer mounted within said cavity in close proximity to said spring;
 a power source; and
 an oscillator circuit supplied by said power source and operable to drive said transducer at the resonant frequency of said weight and spring.

2. A fishing lure comprising:
 a body member having walls defining a water-tight cavity;
 a weight located within said cavity;
 an electromagnetic transducer mounted within said cavity and coupled to said weight;
 a power source; and
 an oscillator circuit supplied by said power source and operable to drive said transducer at a predetermined frequency.

3. The fishing lure of claim 2 wherein said weight is directly connected to said transducer.

4. The fishing lure of claim 2 wherein said transducer includes a transducer coil and a housing, said housing constituting said weight.

* * * * *